E. L. BRADY.
Pipe-Coupling for Railroad Cars.

No. 210,910.　　　　　　Patented Dec. 17, 1878.

WITNESSES　　　　　　　　　　　　INVENTOR
William A. Hinman　　　　　　　　Edwin L. Brady
W. A. Raymond

UNITED STATES PATENT OFFICE.

EDWIN L. BRADY, OF NEW YORK, N. Y.

IMPROVEMENT IN PIPE-COUPLINGS FOR RAILROAD-CARS.

Specification forming part of Letters Patent No. 210,910, dated December 17, 1878; application filed September 23, 1878.

*To all whom it may concern:*

Be it known that I, EDWIN L. BRADY, of New York city, in the county of New York and State of New York, have invented certain new and useful Improvements in Pipe-Couplings for Railroad-Cars; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to improve the construction of pipe-couplings for railroad-cars, for conducting steam, air, water, &c., through the pipes used for heating cars or braking them, as in steam and air brakes.

The invention consists in a coupling provided with a ball-and-socket joint, the ball part of which is provided with a circumferential groove, into which two or more set-screws fit, and serve to adjust the ball part as it wears on its bearing-surface against the socket part; and in connection with the ball-and-socket joint are arranged what are commonly called "side cocks" or valves, with intermediate pieces of pipe, so that a universal motion is obtained, the one giving the vertical and the other the horizontal motion, all of which will be more fully described hereinafter, reference being had to the accompanying drawing and the letters of reference thereon.

Figure 1:
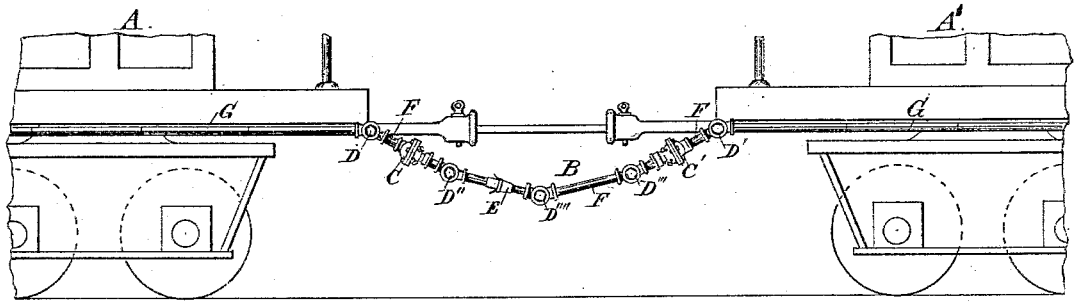
Figure 2:
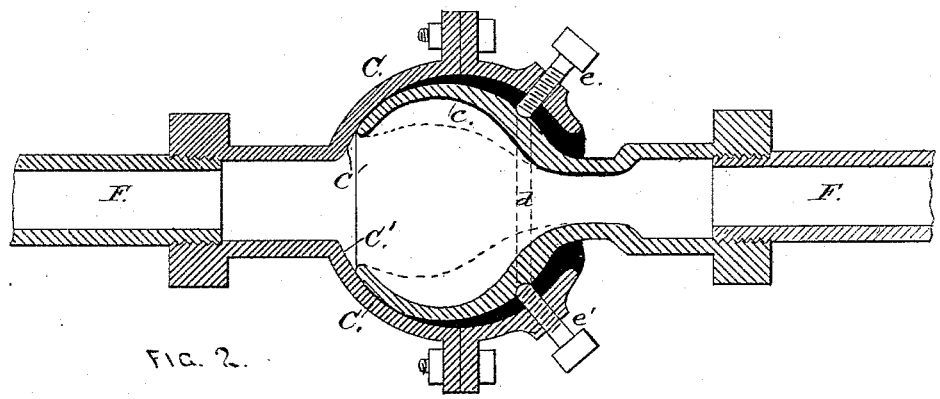
Figure 3:
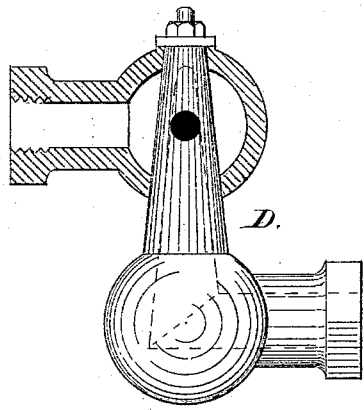

In the accompanying drawing, Figure 1 represents a side elevation of parts of two cars in which the pipes are coupled with my improved coupling. Fig. 2 is a vertical cross-section of the ball-and-socket joint on an enlarged scale. Fig. 3 is a detail view of the side cock.

In the drawing, A and A' are two cars coupled with my coupling B. This coupling consists of two ball-and-socket joints, C C', the ball part $c$ of which is provided with a circumferential groove, $d$, into which the set-screws $e$ $e'$ in the socket part C fit, and by adjusting these screws the open end of the ball is forced against the concavity of the socket part C', and it can therefore be always kept tight.

Elastic packing may be placed between the joints, if desired.

To the pipes G G', arranged either for exhaust or live steam or hot water, for heating the cars, or for air or steam for braking the cars, is attached one end of the side cocks or valves D D', by which the vertical movement is compensated for, (shown in Fig. 3,) and to the other end the short pieces of pipe F, which are connected at their opposite end to the one end of the ball-and-socket joint, while to the other end of said joint is connected another piece of pipe and another side cock or valve, and so on, as may be desired.

Between these side valves are arranged any suitable coupling, E, by which the two ends of my coupling may be coupled and uncoupled, in the ordinary manner. The coupling can be made of any suitable material—iron, composition, &c.—and may be varied to suit different purposes.

The advantages of my improved coupling are, that all the swaying and surging of the cars are compensated for. The entire coupling being of metal, there is no danger of bursting, as in india-rubber or similar tube-couplings. It is not liable to get out of order, and thereby leak. It will last a great while before wearing out. It can be furnished at very small cost, and can be easily adjusted or repaired, or any of its parts can be readily replaced.

I am aware that ball-and-socket joints have been used in couplings for railroad-cars, but not provided with the groove and set-screws, and therefore do not broadly claim a ball and-socket joint for couplings; but,

Having thus described my invention, what I claim, and desire to secure by Letters Patent, is—

1. In a pipe-coupling, the ball-and-socket joint, the ball part of which is provided with a groove for the reception of two or more set-screws in the socket part, arranged as shown, and for the purpose described.

2. The combination of a ball-and-socket joint, provided with a groove, $d$, and set-screws $e$ $e'$, with the side cocks, D D' D'' D''', and intermediate pieces of pipe, all arranged as shown and herein described.

In testimony that I claim the foregoing as my own I hereby affix my signature in presence of two witnesses.

EDWIN L. BRADY.

Witnesses:
 GEORGE H. CREED,
 C. H. RAYMOND.